(12) United States Patent
Abdelaziz et al.

(10) Patent No.: US 12,001,929 B2
(45) Date of Patent: Jun. 4, 2024

(54) MIXED-PRECISION NEURAL PROCESSING UNIT (NPU) USING SPATIAL FUSION WITH LOAD BALANCING

(71) Applicant: Samsung Electronics Co., Ltd., Suwon-si (KR)

(72) Inventors: Hamzah Abdelaziz, San Jose, CA (US); Joseph Hassoun, Los Gatos, CA (US); Ali Shafiee Ardestani, Santa Clara, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 287 days.

(21) Appl. No.: 16/898,433

(22) Filed: Jun. 10, 2020

(65) Prior Publication Data

US 2021/0312325 A1 Oct. 7, 2021

Related U.S. Application Data

(60) Provisional application No. 63/003,883, filed on Apr. 1, 2020.

(51) Int. Cl.
*G06N 20/00* (2019.01)
*H04L 67/1001* (2022.01)

(52) U.S. Cl.
CPC ......... *G06N 20/00* (2019.01); *H04L 67/1001* (2022.05)

(58) Field of Classification Search
CPC ......... G06T 15/005; G06T 11/40; G06T 1/20; G06T 15/405; G06T 2210/08; G06N 3/04; G06N 3/063; G06N 3/0454; G06N 3/08; G06N 3/0445; G06N 3/0472; G06N 3/082; G06N 20/10; G06N 20/20; G06N 20/00; G06F 1/32; G06F 12/0875; G06F 13/28;

(Continued)

(56) References Cited

U.S. PATENT DOCUMENTS 5,471,591 A * 11/1995 Edmondson ........ G06F 12/0804
711/E12.024
5,940,311 A * 8/1999 Dao .................... G06F 9/30025
708/204

(Continued)

*Primary Examiner* — Greg C Bengzon
(74) *Attorney, Agent, or Firm* — Renaissance IP Law Group LLP

(57) ABSTRACT

According to one general aspect, an apparatus may include a machine learning system. The machine learning system may include a precision determination circuit configured to: determine a precision level of data, and divide the data into a data subdivision. The machine learning system may exploit sparsity during the computation of each subdivision. The machine learning system may include a load balancing circuit configured to select a load balancing technique, wherein the load balancing technique includes alternately loading the computation circuit with at least a first data/weight subdivision combination and a second data/weight subdivision combination. The load balancing circuit may be configured to load a computation circuit with a selected data subdivision and a selected weight subdivision based, at least in part, upon the load balancing technique. The machine learning system may include a computation circuit configured to compute a partial computation result based, at least in part, upon the selected data subdivision and the weight subdivision.

20 Claims, 5 Drawing Sheets

(58) Field of Classification Search
CPC ............. G06F 17/15; G06F 2212/452; G06F 9/30145; G06F 17/16; G06F 17/40; G06F 12/0207; G06F 9/3867; G06F 12/04; G06F 13/16; G06F 9/4494; G06F 12/0607; G06F 13/1673; G06F 13/1689; G06F 9/4881; G06F 2209/506; G06F 3/005; G06F 16/535; G06F 16/538; G06F 16/54; G06F 16/951; G06F 21/44; G06F 21/45; G06F 21/53; G06F 21/6254; G06F 21/64; G06F 2209/503; G06F 2221/2117; G06F 9/5044; G06F 9/5066; G06F 9/5072; G06F 9/505; G06F 21/604; G06F 21/6245; G06F 9/3001; G06F 9/30036; G06F 15/8023; G06F 7/5443; G06F 9/30018; G06F 12/1027; G06F 16/9535; G06F 17/153; G06F 9/30112; G06F 9/3013; G06F 9/30134; G06F 12/0811; G06F 12/0842; G06F 12/0884; G06F 15/7832; G06F 15/7842; G06F 2207/3884; G06F 2207/4824; G06F 2207/5352; G06F 2212/1016; G06F 2212/1048; G06F 2212/2515; G06F 2212/603; G06F 3/14; G06F 40/263; G06F 40/42; G06F 40/58; G06F 7/5324; G06F 7/5338; G06F 7/535; G06F 9/30; G06F 9/30014; G06F 9/30025; G06F 9/30032; G06F 9/3004; G06F 9/30043; G06F 9/30072; G06F 9/30087; G06F 9/3802; G06F 9/3869; G06F 9/445; G06F 9/50; G06F 12/0815; G06F 12/0877; G06F 12/1009; G06F 12/1081; G06F 13/38; G06F 15/00; G06F 17/147; G06F 7/52; G06F 9/3851; G06F 9/3887; G06F 9/451; G06F 9/45512; G06F 9/5005; H04N 19/436; H04N 19/117; H04N 19/124; H04N 5/23229; H04N 5/265; H04N 19/44; H04N 19/119; H04N 19/513; H04N 21/2368; H04N 19/439; H04N 5/379; H04N 19/174; H04N 19/42; H04N 5/23267; G06V 10/82; G06V 20/00; G06V 10/454; G06V 10/40; G06V 10/20; G06V 10/75; G06V 10/95; G06V 2201/10; G06V 40/161; G06V 40/20; G06V 10/44; G06V 20/52; G06V 40/103; G06V 10/96; G06V 30/194; G06V 30/274; G06V 10/46; G06V 2201/03; G06V 2201/031; G06V 10/22; G06V 10/25; G06V 10/462; G06V 10/94; G06V 2201/07

See application file for complete search history.

(56) References Cited

U.S. PATENT DOCUMENTS

| | | | | |
|---|---|---|---|---|
| 5,991,863 A * | 11/1999 | Dao | ...................... | G06F 9/3004 711/219 |
| 6,549,930 B1 * | 4/2003 | Chrysos | ................ | G06F 9/4881 718/104 |
| 6,601,084 B1 | 7/2003 | Bhaskaran et al. | | |
| 6,826,704 B1 * | 11/2004 | Pickett | .................. | G06F 9/3836 712/E9.035 |
| 7,079,156 B1 * | 7/2006 | Hutchins | ............... | G06T 15/005 345/607 |
| 7,538,773 B1 * | 5/2009 | Hutchins | ............... | G06T 15/005 345/506 |
| 8,077,181 B2 | 12/2011 | Diard | | |
| 8,411,105 B1 * | 4/2013 | Hutchins | ................. | G06T 11/40 345/596 |
| 8,432,394 B1 * | 4/2013 | Hutchins | ................. | G06T 15/405 345/422 |
| 8,654,133 B2 | 2/2014 | Campbell et al. | | |
| 8,738,860 B1 * | 5/2014 | Griffin | ................ | G06F 12/0897 711/122 |
| 9,489,707 B2 * | 11/2016 | Nalluri | ...................... | G06T 1/20 |
| 10,043,232 B1 * | 8/2018 | Ramadoss | ............ | G06F 9/5083 |
| 10,204,301 B2 * | 2/2019 | Amir | ....................... | G06N 3/04 |
| 10,593,094 B1 * | 3/2020 | Havlir | ..................... | G06F 9/5027 |
| 10,761,822 B1 * | 9/2020 | Borkovic | ............. | G06F 9/30101 |
| 10,846,131 B1 * | 11/2020 | Havlir | ..................... | G06F 9/4843 |
| 2001/0021971 A1 * | 9/2001 | Gibson | ................... | H04N 19/42 712/E9.067 |
| 2004/0006584 A1 * | 1/2004 | Vandeweerd | ............ | G06F 30/33 718/107 |
| 2004/0034759 A1 * | 2/2004 | Katzman | ................ | G06F 9/3828 712/E9.046 |
| 2004/0210610 A1 * | 10/2004 | Mukund | ................... | G06F 5/01 708/209 |
| 2005/0275657 A1 * | 12/2005 | Hutchins | ................. | G06T 11/40 345/506 |
| 2006/0268005 A1 * | 11/2006 | Hutchins | ................. | G06T 11/40 345/606 |
| 2007/0260856 A1 * | 11/2007 | Tran | ....................... | G06F 9/3885 712/217 |
| 2011/0227920 A1 * | 9/2011 | Adams | .................... | G06T 15/005 345/426 |
| 2011/0276784 A1 * | 11/2011 | Gewirtz | ................ | G06F 9/3802 712/216 |
| 2012/0131309 A1 * | 5/2012 | Johnson | .................... | G06F 8/40 712/E9.004 |
| 2014/0006467 A1 * | 1/2014 | Samudrala | ............ | G06F 7/4876 708/503 |
| 2014/0188966 A1 * | 7/2014 | Galal | ..................... | G06F 7/5443 708/501 |
| 2015/0046678 A1 * | 2/2015 | Moloney | ................ | G06F 9/5066 712/29 |
| 2015/0324206 A1 * | 11/2015 | Eisen | ..................... | G06F 9/3851 712/215 |
| 2017/0357891 A1 * | 12/2017 | Judd | ....................... | G06N 3/049 |
| 2018/0046905 A1 * | 2/2018 | Li | .......................... | G06N 3/063 |
| 2018/0165199 A1 * | 6/2018 | Brandt | .................. | G06F 9/30043 |
| 2018/0321938 A1 * | 11/2018 | Boswell | ................ | G06F 9/3012 |
| 2019/0018649 A1 * | 1/2019 | Kroener | ................ | G06F 7/483 |
| 2019/0102356 A1 * | 4/2019 | Guo | ........................ | G06F 17/142 |
| 2019/0102859 A1 * | 4/2019 | Hux | .......................... | G06T 1/20 |
| 2019/0130271 A1 * | 5/2019 | Narang | .................. | G06N 3/04 |
| 2019/0253357 A1 * | 8/2019 | Pathak | ................ | H04L 47/6215 |
| 2019/0303263 A1 * | 10/2019 | Fleming, Jr. | ......... | G06F 11/3024 |
| 2019/0310864 A1 * | 10/2019 | Gutierrez | ............. | G06N 3/063 |
| 2019/0332420 A1 * | 10/2019 | Ukidave | ............... | G06F 9/4843 |
| 2020/0042287 A1 * | 2/2020 | Chalamalasetti | .... | G06N 3/0635 |
| 2020/0097293 A1 * | 3/2020 | Havlir | ................... | G06F 9/3856 |
| 2020/0160181 A1 * | 5/2020 | Zlateski | ................ | G06N 20/10 |
| 2020/0192726 A1 * | 6/2020 | Joo | .......................... | G06N 3/063 |
| 2020/0226473 A1 * | 7/2020 | Sharma | .................. | G06N 3/10 |
| 2020/0380370 A1 * | 12/2020 | Lie | .......................... | G06F 7/483 |
| 2021/0142155 A1 * | 5/2021 | James | ..................... | G06F 7/483 |
| 2021/0182676 A1 * | 6/2021 | Zlateski | ................ | G06N 3/063 |
| 2021/0256362 A1 * | 8/2021 | Lie | .......................... | G06N 3/0472 |
| 2022/0391206 A1 * | 12/2022 | Boswell | ................ | G06F 9/3012 |

\* cited by examiner

|  | C1 COMP | C2 COMP | C3 COMP | C4 COMP | C5 COMP | C6 COMP |
|---|---|---|---|---|---|---|
| Tile 1 | LL 4011 | LL 4012 | LL 4013 | LL 4014 | LL 4015 | LL 4016 |
| Tile 2 | LM 4021 | LM 4022 | LM 4023 | LM 4024 | LM 4025 | LM 4026 |
| Tile 3 | ML 4031 | ML 4032 | ML 4033 | ML 4034 | ML 4035 | ML 4036 |
| Tile 4 | MM 4041 | MM 4042 | MM 4043 | MM 4044 | MM 4045 | MM 4046 |

401

|  | C1 COMP | | C2 COMP | | C3 COMP | | C4 COMP | |
|---|---|---|---|---|---|---|---|---|
| Tile 1 | LL 4111 | | LL 4112 | | LL 4113 | | LL 4114 | |
| Tile 2 | LM 4121 | Stall 499 | LM 4122 | Stall 499 | LM 4123 | Stall 499 | LM 4124 | Stall 499 |
| Tile 3 | ML 4131 | | ML 4132 | Stall 499 | ML 4133 | | ML 4134 | Stall 499 |
| Tile 4 | MM 4141 | Stall 499 | MM 4142 | Stall 499 | MM 4143 | Stall 499 | MM 4144 | Stall 499 |

402

| | | | | | |
|---|---|---|---|---|---|
| Tile 1 | LL 4211 | MM 4212 | LL 4213 | MM 4214 | LL 4215 |
| Tile 2 | ML 4221 | LM 4222 | ML 4223 | LM 4224 | ML 4225 |
| Tile 3 | LM 4231 | ML 4232 | LM 4233 | ML 4234 | LM 4235 |
| Tile 4 | MM 4241 | LL 4242 | MM 4243 | LL 4244 | MM 4245 |

MIXED-PRECISION NEURAL PROCESSING UNIT (NPU) USING SPATIAL FUSION WITH LOAD BALANCING

CROSS-REFERENCE TO RELATED APPLICATION

This application claims priority under 35 U.S.C. § 119 to Provisional Patent Application Ser. No. 63/003,883, entitled "MIXED-PRECISION NPU USING SPATIAL FUSION WITH LOAD BALANCING" filed on Apr. 1, 2020. The subject matter of this earlier filed application is hereby incorporated by reference.

TECHNICAL FIELD

This description relates to machine learning, and more specifically to a mixed-precision neural processing unit (NPU) using spatial fusion with load balancing.

BACKGROUND

Artificial neural networks (ANNs) or connectionist systems are generally computing systems vaguely inspired by the biological neural networks that constitute animal brains. Such systems "learn" (i.e., progressively improve performance on) tasks by considering examples, generally without task-specific programming. For example, in image recognition, they might learn to identify images that contain cats by analyzing example images that have been manually labeled as "cat" or "no cat" and using the results to identify cats in other images. They do this without any a priori knowledge about cats, e.g., that they have fur, tails, whiskers and cat-like faces. Instead, they evolve their own set of relevant characteristics from the learning material that they process.

A neural network is often based on a collection of connected units or nodes called artificial neurons. Each connection (a simplified version of a synapse) between artificial neurons can transmit a signal from one to another. The artificial neuron that receives the signal can process it and then signal artificial neurons connected to it. In common neural network implementations, the signal at a connection between artificial neurons is a real number, and the output of each artificial neuron is calculated by a non-linear function of the sum of its inputs. Artificial neurons and connections typically have a weight that adjusts as learning proceeds. The weight increases or decreases the strength of the signal at a connection. Artificial neurons may have a threshold such that only if the aggregate signal crosses that threshold is the signal sent. Typically, artificial neurons are organized in layers. Different layers may perform different kinds of transformations on their inputs. Signals travel from the first (input), to the last (output) layer, possibly after traversing the layers multiple times. An artificial intelligence accelerator or neural processing unit (NPU) is generally a class of specialized hardware accelerator or computer system designed to accelerate artificial intelligence applications, especially artificial neural networks, machine vision and machine learning.

SUMMARY

According to one general aspect, an apparatus may include a machine learning system. The machine learning system may include a precision determination circuit configured to: determine a precision level of data, and divide the data into a data subdivision. The machine learning system may include a load balancing circuit configured to select a load balancing technique, wherein the load balancing technique includes alternately loading the computation circuit with at least a first data/weight subdivision combination and a second data/weight subdivision combination. The load balancing circuit may be configured to load a computation circuit with a selected data subdivision and a selected weight subdivision based, at least in part, upon the load balancing technique. The machine learning system may include a computation circuit configured to compute a partial computation result based, at least in part, upon the selected data subdivision and the weight subdivision.

According to another general aspect, an apparatus may include a machine learning system. The machine learning system may include a fusion circuit configured to combine a first partial computation result with a second partial computation result to form a combined computation result. The machine learning system may include a first computation circuit configured to compute the first partial computation result. The machine learning system may include a second computation circuit configured to compute the second partial computation result. The machine learning system may include a load balancing circuit configured to select a load balancing technique, wherein the load balancing technique includes loading, in a preset pattern, the first computation circuit with either a slow data/weight subdivision combination or a faster data/weight subdivision combination, wherein the terms "fast" and "slow" refer to the computation associated with the data/weight subdivision combination.

According to another general aspect, an apparatus may be configured to provide a neural network. The apparatus may include a fusion circuit configured to combine a first partial computation result with a second partial computation result to form a combined computation result. The apparatus may include a first computation circuit configured to compute the first partial computation result associated with a first cell of data, and based, in part, upon a first data subdivision of the first cell. The apparatus may include a second computation circuit configured to compute the second partial computation result associated with a second data subdivision of the first cell of data at least partially concurrently with the computation of the first partial computation result. The apparatus may include a load balancing circuit configured to select a load balancing technique, wherein the load balancing technique includes rotating data/weight subdivision combinations between the first computation circuit and the second computation circuit to reduce desynchronization between the partial computation results of the first cell and the second cell.

The details of one or more implementations are set forth in the accompanying drawings and the description below. Other features will be apparent from the description and drawings, and from the claims.

A system and/or method for machine learning, and more specifically to a mixed-precision neural processing unit (NPU) using spatial fusion with load balancing, substantially as shown in and/or described in connection with at least one of the figures, as set forth more completely in the claims.

BRIEF DESCRIPTION OF THE DRAWINGS

FIG. 4 is a block diagram of example embodiments of computation flows in accordance with the disclosed subject matter.

Like reference symbols in the various drawings indicate like elements.

DETAILED DESCRIPTION

Figure 1:
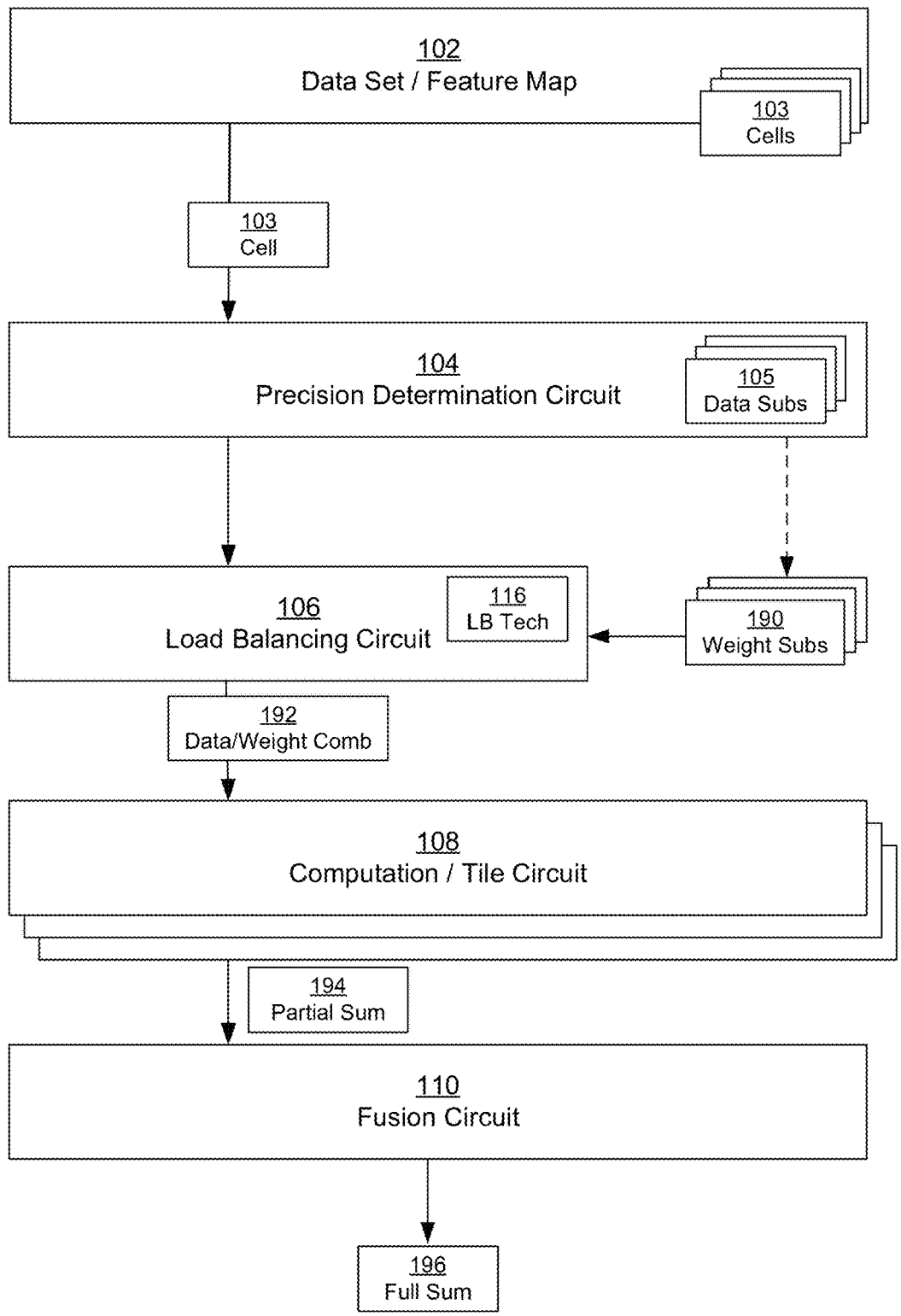
FIG. 1 is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

Likewise, electrical terms, such as "high" "low", "pull up", "pull down", "1", "0" and the like, may be used herein for ease of description to describe a voltage level or current relative to other voltage levels or to another element(s) or feature(s) as illustrated in the figures. It will be understood that the electrical relative terms are intended to encompass different reference voltages of the device in use or operation in addition to the voltages or currents depicted in the figures. For example, if the device or signals in the figures are inverted or use other reference voltages, currents, or charges, elements described as "high" or "pulled up" would then be "low" or "pulled down" compared to the new reference voltage or current. Thus, the exemplary term "high" may encompass both a relatively low or high voltage or current. The device may be otherwise based upon different electrical frames of reference and the electrical relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of an example embodiment of a system 100 in accordance with the disclosed subject matter. In various embodiments, the system 100 may include a neural processing unit (NPU), or include another form of computing device, such as, for example, a laptop, desktop, workstation, personal digital assistant, smartphone, tablet, and other appropriate computers or a virtual machine or virtual computing device thereof. In various embodiments, the system 100 may include a convolution neural network (CNN) or another machine learning technique. It is understood that the above are merely a few illustrative examples to which the disclosed subject matter is not limited.

In various embodiments, different quantization schemes may be used to quantize weights and/or activations as part of deep learning techniques. These quantization schemes may utilize or include different quantization precisions, such as, for example, 8-bits, or 4-bits. In various embodiments, mixed-precision NPUs may support performing different deep learning techniques with different levels of precision (e.g., a different number of bits per weight).

In such an embodiment, a mixed-precision system may be built using low precision multiplication units (e.g., computation circuit 108). Temporal or spatial fusion may be employed in mixed-precision systems to support higher precision computation. In various embodiments involving spatial fusion, multiplication units (e.g., computation circuits 108) may be divided into multiple subdivisions or groups of circuits, referred to as "tiles".

In some embodiments, high precision or high-bit data may be divided into low precision or low-bit components (e.g., 8-bit bytes into 4-bit nibbles) and distributed to each tile according to the component location (e.g., most significant nibble (MSN), low or least significant nibbles (LSN)).

In various embodiments, the NPU or system may exploit data sparsity in order to gain a performance improvement. In this context, "sparse" means the NPU may skip the ineffectual calculations, such as, multiplying by zeros. In such an embodiment, a tile that receives input data with high sparsity (i.e., lots of zeros) may skip many of its computations and therefore will finish faster than a tile that receives input with less zeros. On the other hand, in this context, "dense" is the opposite of sparse which means that the NPU does not skip ineffectual computation, (e.g., multiplication with zero), and the tile will perform the multiplication even if the input is zero. In various embodiments, the percentage of data sparsity may differ across the low/high precision subdivisions. For example, an MSN subdivision may take less time to compute than an LSN subdivision since the MSN may have more sparse data. This is in addition to the sparsity caused by the data itself.

In some embodiments, this means that a set of computation tiles that processes data subdivisions with different compute times (sparsity ratios) may stall in order to wait for the other sets to finish their computation. In such an embodiment, this stalling may allow the results from all the tiles (in a group) to be fused correctly into the high precision data. In various embodiments, the system 100 may employ different load balancing techniques in order to minimize or reduce the stalling time due to the difference in sparsity distribution of data components.

In one embodiment, the system 100 may include or have access to a data set or feature map 102. In various embodiments, the feature map 102 may include the data to be processed by the system 100. In some embodiments, the feature map 102 may include raw data that has been filtered or processed by a prior convolution or other operation or layer (not shown). In various embodiments, the data or feature map 102 may be divided into cells 103. In various embodiments, each cell may include a pixel or group of pixels. For example, in one embodiment, the feature map 102 may include a series of video frames. In various embodiments, the cells 103 may be tagged or categorized into groups (e.g., even and odd) to aid processing.

In various embodiments, the system 100 may include a precision determination circuit or unit 104. In the illustrated embodiment, the precision determination circuit or unit 104 may be configured to determine a precision level of data (e.g., a cell 103). For example, the precision level may be one of multiple levels, such as high or low. In a specific embodiment, the high level precision may include 8-bits per piece or unit of data, and a low precision level may include 4-bits per piece or unit of data. It is understood that the above are merely a few illustrative examples to which the disclosed subject matter is not limited.

In some embodiments, the precision determination circuit or unit 104 may be configured to split or group the data (e.g., a cell 103) into smaller subdivisions 105. In various embodiments, the cell data may be divided into smaller precision subdivisions. In such an embodiment, each cell subdivision may have the same shape of the cell, for example, a cell that includes a vector of n numbers may be divided into subdivisions that each include a vector of n numbers but with smaller precision, as described below. In one such embodiment, the precision determination circuit 104 may divide 8-bit bytes of data into two 4-bit nibbles of data, an MSN and an LSN. Likewise, the precision determination circuit 104 or a similar precision circuit (not shown) may take weight data or values and divide them into smaller precision weight subdivisions 190. It is understood that the above is merely one illustrative example to which the disclosed subject matter is not limited.

In various embodiments, the system 100 may include a load balancing circuit 106. In such an embodiment, the load balancing circuit 106 may be configured to select a load balancing technique 116 to employ when assigning data to the computation circuits 108. In various embodiments, the load balancing technique 116 may be configured to reduce stalling or period of time in which the computation circuits 108 perform little or no processing due to the difference in the amount of time each data subdivision or nibble 116 may take to process. These load balancing techniques 105 are discussed in more detail below.

In the illustrated embodiment, the load balancing circuit 106 may be configured to load or assign (and another circuit may load) the specific data subdivisions 105 and weight subdivisions 190 to various computation circuits 108 or tiles. In such an embodiment, these data/weight combinations 192 may be created and assigned based, at least in part, upon the selected load balancing technique 116.

In the illustrated embodiment, the system 100 may include one or more computation circuits 108 or tiles. In such an embodiment, the tiles 108 may be configured to compute a partial sum 194 from the assigned data/weight combination 192.

In the illustrated embodiment, the system 100 may include a fusion circuit 110. As described above, the fusion circuit 110 may be configured to combine multiple partial sums 194 to form a combined, fused, or full sum 196.

In various embodiments, the process described above may be repeated for a next cell 103 until the data set 102 has been processed. In such an embodiment, the series of full sums 196 may result in a new data set (not shown). This new data set may then be further processed by another layer of the system 100, or may be the final result of the system 100.

Figure 2:
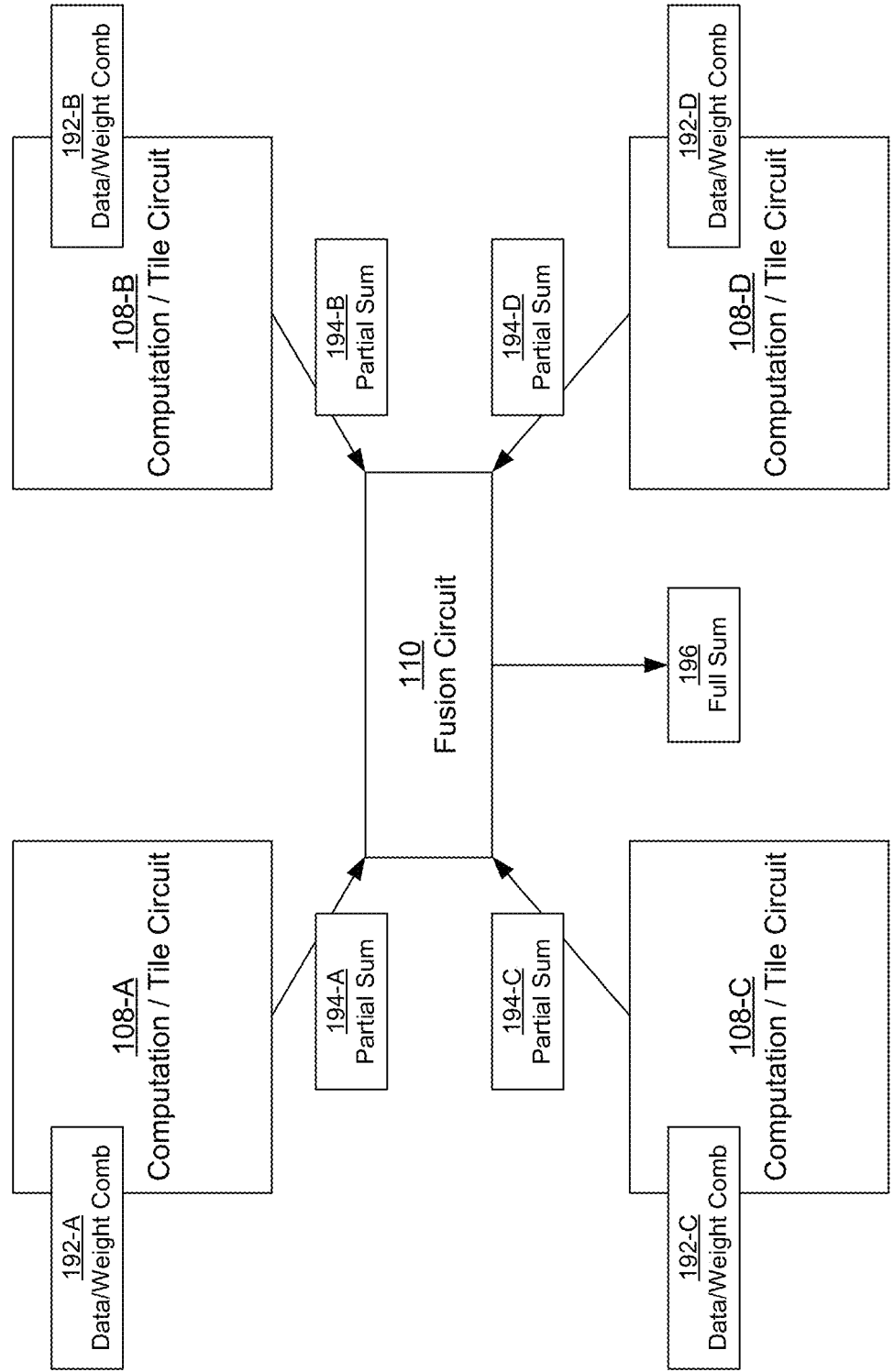
FIG. 2 is a block diagram of an example embodiment of a system in accordance with the disclosed subject matter.

FIG. 2 is a block diagram of an example embodiment of a system 200 in accordance with the disclosed subject matter. In the illustrated embodiment, system 200 may employ computational circuits 108 and fusion circuit 110, as described above in reference to FIG. 1. It is understood that the system 200 is merely one illustrative example to which the disclosed subject matter is not limited.

In the illustrated embodiment, the system 200 may include four tiles or computation circuits 108 grouped together. In various embodiments, the entire machine learning system may include many more groups of tiles 108, in the same or different configurations. In some embodiments, the computation circuits 108 may include four 4-bit multiplier circuits configured to perform small or low precision computations.

In the illustrated embodiment, each tile 108 may be assigned or loaded with a specific data/weight combination 192. In such an embodiment, the total system 200 may be assigned combinations 192 such that an entire cell of data is processed at a given time.

For example, in one embodiment, tile 108-A may be loaded with the data/weight combination 192-A that includes the data LSN and the weight LSN, or combination LL (least-least). Tile 108-B may be loaded with the data/weight combination 192-B that includes the weight LSN and the data MSN, or combination LM (least-most). Tile 108-C may be loaded with the data/weight combination 192-C that includes the weight MSN and the data LSN, or combination ML (most-least). Tile 108-D may be loaded with the data/weight combination 192-D that includes the data MSN and the weight MSN, or combination MM (most-most). In such an embodiment, the four data/weight combinations may be referred to as LL, LM, ML, and MM.

As described above, the tiles 108 may produce the four partial sums 194-A, 194-B, 194-C, and 194-D. The system 200 may include fusion circuit 110 configured to combine or fuse these partial sums 194 into a full sum 196 for that cell.

As described above, in one embodiment, the system 200 pipeline may require that all data/weight combinations 192 be processed for a given cell before the next cell may begin processing. In such an embodiment, this may involve stalling one or more tiles 108 as a "slow" tile 108 finishes computing.

In the illustrated embodiment, the system 200 may be configured to accommodate the sparsity of the data set and allow data/weight combinations from newer cells (e.g., a next pixel of an image) to begin processing before the entirety of the prior cell is computed.

Figure 3:
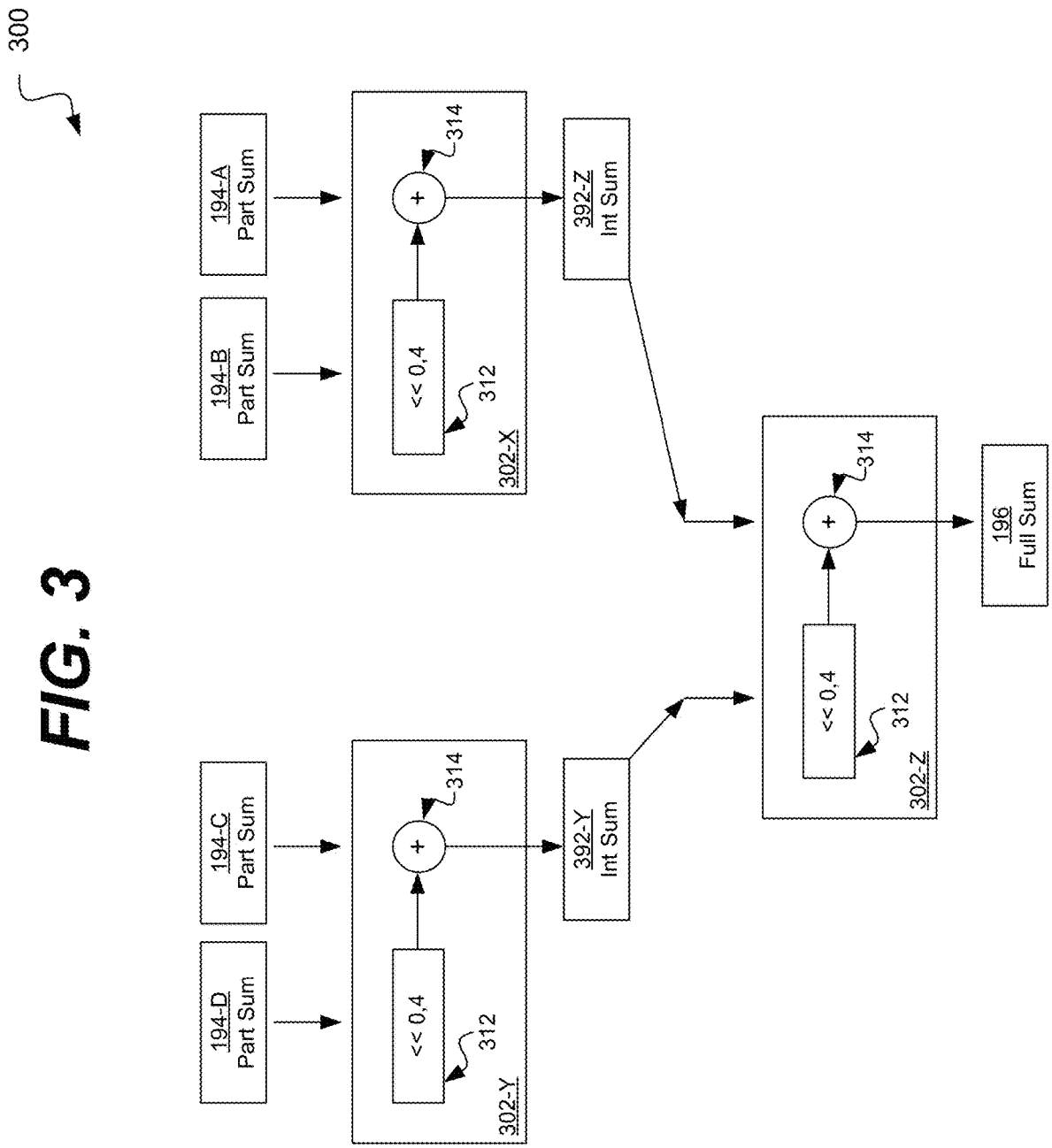
FIG. 3 is a block diagram of an example embodiment of an apparatus in accordance with the disclosed subject matter.

FIG. 3 is a block diagram of an example embodiment of an apparatus 300 in accordance with the disclosed subject matter. In various embodiments, the apparatus 300 may include a fusion circuit, such as illustrated in FIG. 1 or 2. In the illustrated embodiment, a fusion circuit 300 that is associated with four computation circuits is shown, but other levels of association, including dynamic rearrangement are contemplated. It is understood that the above is merely one illustrative example to which the disclosed subject matter is not limited.

In one embodiment, the apparatus 300 may receive a number (e.g., four) partial sums 194 from the computation units, as described above. In some embodiments, the partial sum 194-D may include the MM computation result (e.g., sum) and may be represented by Equation 1 below. The partial computation result 194-C may include the ML computation result and may be represented by Equation 2 below. The partial computation result 194-B may include the LM computation result and may be represented by Equation 3 below. The partial computation result 194-A may include the LL computation result and may be represented by Equation 4 below.

$$\text{Partial Result}_{MM} = \Sigma(W_{MSN} \times A_{MSN}) \quad \text{Equation 1:}$$

$$\text{Partial Result}_{ML} = \Sigma(W_{MSN} \times A_{LSN}) \quad \text{Equation 2:}$$

$$\text{Partial Result}_{LM} = \Sigma(W_{LSN} \times A_{MSN}) \quad \text{Equation 3:}$$

$$\text{Partial Result}_{LL} = \Sigma(W_{LSN} \times A_{LSN}) \quad \text{Equation 4:}$$

... where A is the data or activation, and W is the weight.

In the illustrated embodiment, each pairing of the partial computation results may enter a partial fusion circuit 302. In the illustrated embodiment, the partial computation results 194-D and 194-C may be assigned to partial fusion circuit 302-Y, and the partial computation results 194-B and 194-A may be assigned to partial fusion circuit 302-X. In various embodiments, an input may go to shifter in some pixels (e.g., even pixels) and may go directly in adder the other case (e.g., odd pixels). A swap block or multiplexer (not shown) may be employed to route the inputs to the adder and the shifter.

Each partial fusion circuit 302 may include a bit shifter 312 and a summer or adder 314. In the illustrated embodiment, one partial computation result (e.g., partial computation results 194-D and 194-B) may be shifted before being added to the other partial computation result (e.g., partial computation results 194-C and 194-A). In various embodiments, the partial fusion circuit 302 and the system 300 in general may include registers or memory cells to store the computation results 194, 392, and 196. Some of these registers are illustrated by the blocks for the computation results 194, 392, and 196. In some embodiments, these registers may facilitate pipelining.

In one embodiment, the partial computation results 194 may be 16-bit values. The shifter 312 may include a four bit shifter that produces a 20-bit value. The adder 314 may output a 21-bit intermediate computation result 392. It is understood that the above is merely one illustrative example to which the disclosed subject matter is not limited.

In various embodiments, the partial computation results 194 may be grouped and input into the partial fusion circuits 302 such that the number of required shift operations (e.g., via shifter 312) is less than or equal to the size or width of the nibble or data subdivision. For example, by not placing both the MM and LL partial computation results 192 into the same partial fusion circuit 302, only a bit shift equal to the size of the nibble (4-bit) is needed, as opposed to bit shift equal to the full byte (8-bit).

In the illustrated embodiment, these intermediate computation results 394 may be input into a third partial fusion circuit 302. The output or full computation result 196 may be given by Equation 5 below.

$$\text{Full Result} = [\Sigma(W_{LSN} \times A_{LSN}) + \Sigma(W_{LSN} \times A_{MSN})_{<<N}] + [\Sigma(W_{MSN} \times A_{LSN}) + \Sigma(W_{MSN} \times A_{MSN})_{<<N}]_{<<N} \quad \text{Equation 5:}$$

... where A is the data or activation, W is the weight, and "<<N" indicates a shift of n-bits (e.g., a 4-bit shift).

In one embodiment, the partial computation result 192 may represent 4-bits by 4-bits values (4×4) values. The intermediate computation results 392 may represent 4×8 or 8×4 values. The full computation result 196 may represent an 8×8 value. It is understood that the above is merely one illustrative example to which the disclosed subject matter is not limited.

FIG. 4 is a block diagram of example embodiments of computation flows 400, 401, and 402 in accordance with the disclosed subject matter. In various embodiments, the machine learning system or apparatus may be configured to select between one or more load balancing techniques. The computation flows 400, 401, and 402 of FIG. 4 illustrate some possible examples.

In the illustrated embodiment, the machine learning system includes four tiles or computation circuits, although other numbers are contemplated. In such an embodiment, the machine learning system may compute the partial computation results of a series of cells in a pipelined fashion.

Computation flow 400 shows a traditional computational flow, in which each data/weight combination (e.g., LL, ML, LM, or MM) take the exact same amount of time to process. Computation flow 400 shows an example of dense architecture in which zeros are not skipped. The jobs or computation tasks of the tiles 1, 2, 3, and 4 are shown as rows in the computation flow 400. Whereas the pipelined cell computations are shown as columns, for example, Cell 1 (C1), Cell 2 (C2), Cell 3 (C3), Cell 4 (C4), Cell 5 (C5), Cell 6 (C6), and so on for however many cells are processed. In the illustrated embodiment, processing tasks are shown as tasks 4011-4046.

Computation flow 401 shows a computational flow in which sparsity is exploited (e.g., zeros are skipped), in which each data/weight combination (e.g., LL, ML, LM, or MM) takes a different amount of time to process. However, the system may still work in lock-step, such that new data/weight combinations from new cells may not be processed until all of the data/weight combinations from current cell are finished processing. In the illustrated embodiment, processing tasks are shown as tasks 4111-4144.

For example, despite Tile 2's task 4121 (LM) taking less time to process than Tile 1's task 4111 (LL), Tile 2 may not move forward and begin to process the next subdivision or cell's task 4122 (LL). Instead, Tile 2 must wait or stall 499, until the slowest task (e.g., task 4111) is done computing. This way all of the partial computation results for a particular cell may be presented to the fusion circuit substantially simultaneously. The delay is even more egregious for tasks that complete very quickly (e.g., Tile 4's task (MM)).

Computation flow 402 shows a particular embodiment of the system in which system takes advantage of the sparsity of the data set to speed computation and reduce the stall 499 time. In such an embodiment, the cells may be divided into groups (e.g., even and odd, etc.) and the load balancing circuit may alternate or rotate between the groups. In the illustrated embodiment, one cell group is colored white and the other grey. It is understood that the above is merely one illustrative example to which the disclosed subject matter is not limited.

In such an embodiment, when the task for one (a first) cell group is completed (e.g., Tile 2's task 4221) a task associated with another (a second) cell group (e.g., Tile 2's task 4222) may be started, even if another task associated with the first cell group is still being processed (e.g., Tile 3's task 4231). In such an embodiment, computation time may be reduced, due to the lack of stalls 499. For example, in computation flow 402 many of the tasks associated with Cell 4 (e.g., tasks 4223, 4233, and 4243) may complete before similar tasks (e.g., tasks 4123, 4133, and 4143) would even begin in computation flow 401.

In various embodiments, the computation circuits, fusion circuit, or system as a whole may include one or more registers or queues to hold and synchronize the partial computation results as the complete at different times. In one embodiment, the registers or queues may be part of the registers shown in FIG. 3. It is understood that the above is merely one illustrative example to which the disclosed subject matter is not limited. In some embodiments, multiple fusion circuits may be included in the system, each associated with one or more cell groups (e.g., even and odd fusion circuits).

In various embodiments, stalls 499 may be introduced to prevent partial computation results from different cells (e.g., cell 1 and cell 3) from being enqueued to a fusion circuit at the same time. In another embodiment, no stalls 499 may be introduced.

It is understood that the illustrated computation flows 400, 401, and 401 are not to scale and that while the cell computation times are shown as repetitive for ease of illustration, each cell may involve its own computation time and variance from the norm.

In some embodiments, the architectural speed or processing speed is limited (e.g., computation flow 401) by the slowest data/weight combination. Typically, this may be the LL slowest data/weight combination. In the illustrated embodiment, the machine learning system may attempt to, over time, assign the slowest data/weight combination to different tiles or competition circuits to vary which tile is the slowest. In such an embodiment, as shown in computation flow 402 the completion of the cell tasks may occur relatively close together. This is compared to what a stall-less version of computation flow would look like with Tile 1 always being the slowest and getting further and further behind the other tiles. Such a delay would eventually hinder the fusion circuit's ability to combine the partial computation results for a given cell as one partial computation result would be unavailable for a substantial period of time. In the illustrated embodiment, load balancing is employed to spread the delay or processing time out between the tiles, and therefore more closely align (without resorting to stalls) the availability of all the partial computation results for a given cell. In various embodiments, this may be referred to as synchronization of the cell's partial computation results.

In various embodiments, the load balancing circuit may select from one or more load balancing techniques. In the illustrated embodiment, the computation flow 402 makes use of a static toggling load balancing technique in which each tile is assigned one of two data/weight combinations and the load balancing circuit alternates between the two. In the illustrated embodiment, the two data/weight combinations for each tile are as follows:

Tile 1: LL and MM
Tile 2: LM and ML
Tile 3: ML and LM
Tile 4: MM and LL In various embodiments, a round robin or rotating scheme may be employed. In one such an embodiment, this may allow each tile or computation circuit to process each data/weight combination (e.g., LL, MM, etc.) and more closely align the partial computation results by evening out the delay caused by long processing combinations. In one such embodiment, the data/weight combinations for each tile may be as follows:

Tile 1: LL, then MM, then LM, then ML, then repeat.
Tile 2: LM, then ML, then LL, then MM, then, repeat.
Tile 3: ML, then LM, then MM, then LL, then repeat.
Tile 4: MM, then LL, then ML, then LM, then repeat.

In such an embodiment, it is noted that the fusion circuit would not have the LL and MM combinations applied to the same partial fusion circuit and thus avoid excessive bit shifting, as described above.

It is understood that the above are merely a few illustrative examples to which the disclosed subject matter is not limited.

In various embodiments, the load balancing may be static, as described above, or dynamic. In some embodiments, various forms of dynamic load balancing may be employed. In some embodiments, the form of load balancing may be configurable. In some embodiments, the data set may be analyzed, and the form of load balancing may be selected automatically. For example, a first load balancing technique may be employed for still images, a second load balancing technique may be employed for still videos, and a third for other types of data (e.g., predictive data analysis). It is understood that the above are merely a few illustrative examples to which the disclosed subject matter is not limited.

In one embodiment, the spatial technique may be configurable. In one such embodiment, the machine learning system may be able to perform a dense (e.g., computation flows 400, and then switch to a sparsity aware technique (e.g., computation flow 402). Likewise, the load balancing technique may be configurable separately or in conjunction with the special aspect. In one such embodiment, the machine learning system may perform in lock-step but employ load balancing to reduce stall times (e.g., computation flow 401). It is understood that the above are merely a few illustrative examples to which the disclosed subject matter is not limited.

Figure 5:
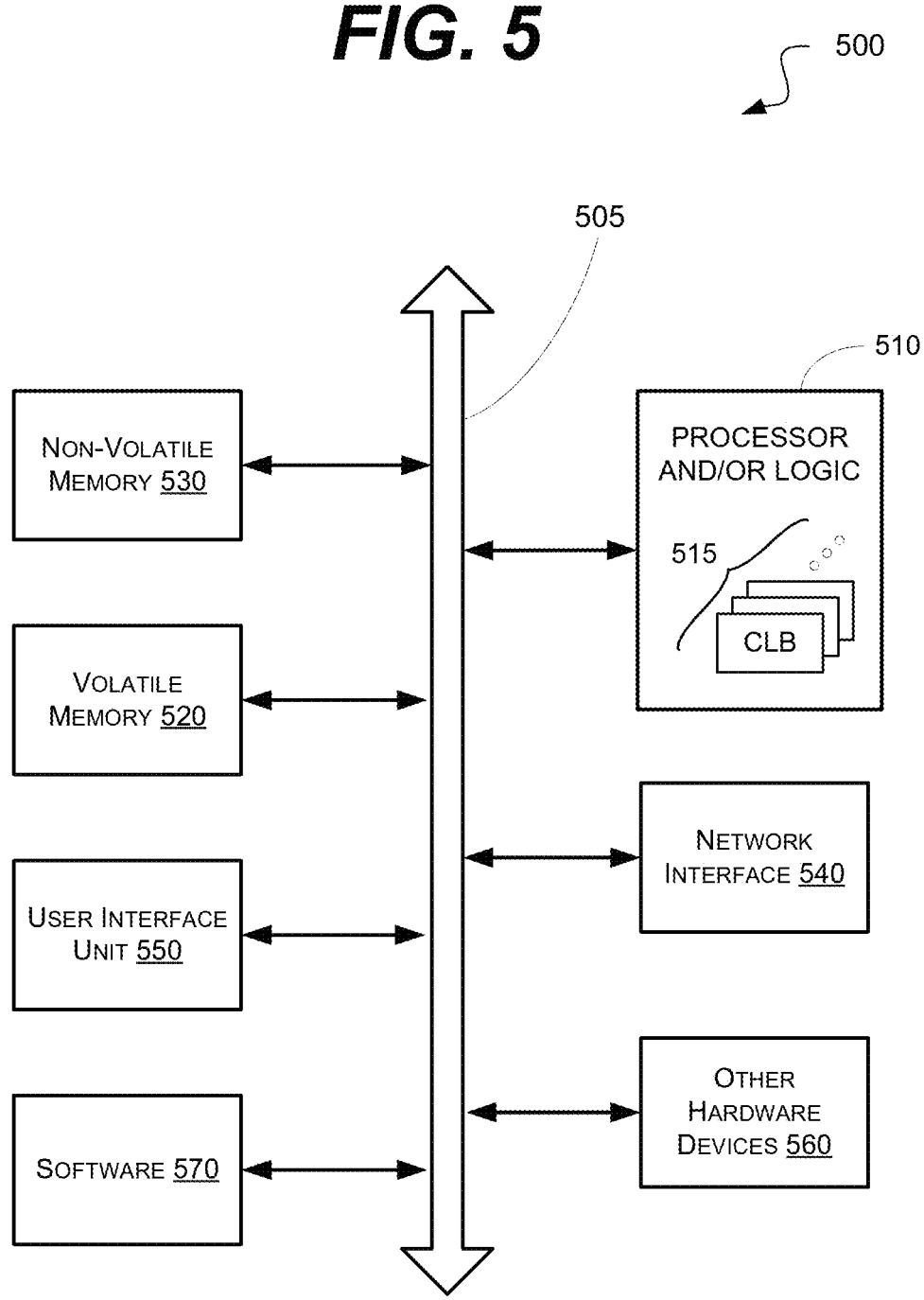
FIG. 5 is a schematic block diagram of an information processing system that may include devices formed according to principles of the disclosed subject matter.

FIG. 5 is a schematic block diagram of an information processing system 500, which may include semiconductor devices formed according to principles of the disclosed subject matter.

Referring to FIG. 5, an information processing system 500 may include one or more of devices constructed according to the principles of the disclosed subject matter. In another embodiment, the information processing system 500 may employ or execute one or more techniques according to the principles of the disclosed subject matter.

In various embodiments, the information processing system 500 may include a computing device, such as, for example, a laptop, desktop, workstation, server, blade server, personal digital assistant, smartphone, tablet, and other appropriate computers or a virtual machine or virtual computing device thereof. In various embodiments, the information processing system 500 may be used by a user (not shown).

The information processing system 500 according to the disclosed subject matter may further include a central processing unit (CPU), logic, or processor 510. In some embodiments, the processor 510 may include one or more functional unit blocks (FUBs) or combinational logic blocks (CLBs) 515. In such an embodiment, a combinational logic block may include various Boolean logic operations (e.g., NAND, NOR, NOT, XOR), stabilizing logic devices (e.g., flip-flops, latches), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 500 according to the disclosed subject matter may further include a volatile memory 520 (e.g., a Random Access Memory (RAM)). The information processing system 500 according to the disclosed subject matter may further include a non-volatile memory 530 (e.g., a hard drive, an optical memory, a NAND or Flash memory). In some embodiments, either the volatile memory 520, the non-volatile memory 530, or a combination or portions thereof may be referred to as a "storage medium". In various embodiments, the volatile memory 520 and/or the non-volatile memory 530 may be configured to store data in a semi-permanent or substantially permanent form.

In various embodiments, the information processing system 500 may include one or more network interfaces 540 configured to allow the information processing system 500 to be part of and communicate via a communications network. Examples of a Wi-Fi protocol may include, but are not limited to, Institute of Electrical and Electronics Engineers (IEEE) 802.11g, IEEE 802.11n. Examples of a cellular protocol may include, but are not limited to: IEEE 802.16m (a.k.a. Wireless-MAN (Metropolitan Area Network) Advanced, Long Term Evolution (LTE) Advanced, Enhanced Data rates for GSM (Global System for Mobile Communications) Evolution (EDGE), Evolved High-Speed Packet Access (HSPA+). Examples of a wired protocol may include, but are not limited to, IEEE 802.3 (a.k.a. Ethernet), Fibre Channel, Power Line communication (e.g., Home-Plug, IEEE 1901). It is understood that the above are merely a few illustrative examples to which the disclosed subject matter is not limited.

The information processing system 500 according to the disclosed subject matter may further include a user interface unit 550 (e.g., a display adapter, a haptic interface, a human interface device). In various embodiments, this user interface unit 550 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 500 may include one or more other devices or hardware components 560 (e.g., a display or monitor, a keyboard, a mouse, a camera, a fingerprint reader, a video processor). It is understood that the above are merely a few illustrative examples to which the disclosed subject matter is not limited.

The information processing system 500 according to the disclosed subject matter may further include one or more system buses 505. In such an embodiment, the system bus 505 may be configured to communicatively couple the processor 510, the volatile memory 520, the non-volatile memory 530, the network interface 540, the user interface unit 550, and one or more hardware components 560. Data processed by the processor 510 or data inputted from outside of the non-volatile memory 530 may be stored in either the non-volatile memory 530 or the volatile memory 520.

In various embodiments, the information processing system 500 may include or execute one or more software components 570. In some embodiments, the software components 570 may include an operating system (OS) and/or an application. In some embodiments, the OS may be configured to provide one or more services to an application and manage or act as an intermediary between the application and the various hardware components (e.g., the processor 510, a network interface 540) of the information processing system 500. In such an embodiment, the information processing system 500 may include one or more native applications, which may be installed locally (e.g., within the non-volatile memory 530) and configured to be executed directly by the processor 510 and directly interact with the OS. In such an embodiment, the native applications may include pre-compiled machine executable code. In some embodiments, the native applications may include a script interpreter (e.g., C shell (csh), AppleScript, AutoHotkey) or a virtual execution machine (VM) (e.g., the Java Virtual Machine, the Microsoft Common Language Runtime) that are configured to translate source or object code into executable code which is then executed by the processor 510.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SS OP) technique, a thin small outline package (TS OP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts is to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus, comprising:
a machine-learning system comprising:
a precision-determination circuit configured to separate a first value of a data set into a second value and a third value, the first value comprising a first predetermined number of bits, the second value comprising a second predetermined number of contiguous most-significant bits of the first value and the third value comprising a third predetermined number of contiguous least-significant bits of the first value, the first predetermined number equaling the second predetermined number plus the third predetermined number;
a load-balancing circuit configured to:
select for computation:
a first combination comprising the second value and the second predetermined number of contiguous bits of a first weight value corresponding to the first value, the second value comprising a first multiplicand of the first combination and the second predetermined number of contiguous bits of the first weight value comprising a second multiplicand of the first combination, and
a second combination comprising the third value and the third predetermined number of bits of the first weight value, the third value comprising a first multiplicand of the second combination and the third predetermined number of contiguous bits of the first weight value comprising a second multiplicand of the second combination; and
a first computation circuit configured to compute a first partial product of the first multiplicand and the second multiplicand of the first combination based on the load-balancing circuit being configured to alternate between loading the first computation circuit with (a) most-significant bits of a first data set and most-significant bits of a weight value of the first data set, and (b) least-significant bits of a second data set and least-significant bits of a weight value of the second data set; and
a second computation circuit configured to compute a second partial product of the first multiplicand and the second multiplicand of the second combination based on the load-balancing circuit being configured to alternate between loading the second computation circuit with (a) least-significant bits of the first data set and least-significant bits of the weight value of the first data set, and (b) most-significant bits of the second data set and most-significant bits of the weight value of the second data set.

2. The apparatus of claim 1, wherein the machine-learning system further comprises a fusion circuit configured to combine the first partial product with at least a second partial product to form a combined product, the second partial product being computed from the first combination or the second combination that was unselected by the load-balancing circuit.

3. The apparatus of claim 2, wherein a load-balancing technique used by the load-balancing circuit causes the fusion circuit to shift a partial product the second predetermined number of bits or the third predetermined number of bits.

4. The apparatus of claim 1, wherein a load-balancing technique used by the load-balancing circuit comprises:
alternately loading the computation circuit with the first combination and the second combination.

5. The apparatus of claim 1, wherein:
the second predetermined number equals the third predetermined number, and
the load-balancing circuit is further configured to:
select one of the first combination, the second combination, a third combination comprising the second value being a first multiplicand of the third combination and the third predetermined number of contiguous bits of the first weight value, the third predetermined number of contiguous bits of the first weight value being a second multiplicand of the third combination, and a fourth combination comprising the third value being a first multiplicand of the fourth combination and the second predetermined number of bits of the first weight value, the second predetermined number of contiguous bits of the first weight value being a second multiplicand of the fourth combination, and
load, in a round robin fashion, the computation circuit with the first combination, the second combination, the third combination, and the fourth combination.

6. The apparatus of claim 1, wherein the first combination and the second combination are selected from different cells of data.

7. The apparatus of claim 1, wherein a load-balancing technique used by the load-balancing circuit comprises a static load-balancing technique.

8. The apparatus of claim 1, wherein the load-balancing circuit is further configured to select a load-balancing technique that reduces an amount of time the computation circuit is stalled.

9. An apparatus, comprising:
a machine-learning system comprising:
a first computation circuit configured to compute a first partial product based on a first multiplicand and a second multiplicand loaded into the first computation circuit;
a second computation circuit configured to compute a second partial product based on a third multiplicand and a fourth multiplicand loaded into the second computation circuit;
a precision-determination circuit configured to separate a first value of a data set into a second value and a third value, the first value comprising a first predetermined number of bits, the second value comprising a second predetermined number of contiguous most-significant bits of the first value and the third value comprising a third predetermined number of contiguous least-significant bits of the first value, the first predetermined number equaling the second predetermined number plus the third predetermined number;
a load-balancing circuit configured to:
select a first selection and a second selection from:
a first combination comprising the second value and the second predetermined number of contiguous bits of a first weight value corresponding to the first value, the second value comprising a first multiplicand of the first combination and the second predetermined number of contiguous bits of the first weight value comprising a second multiplicand of the first combination, and
a second combination comprising the third value and the third predetermined number of bits of the first weight value, the third value comprising a first multiplicand of the second combination and the third predetermined number of contiguous bits of the first weight value comprising a second multiplicand of the second combination,
load the first computation circuit with the first selection based on the load-balancing circuit being configured to alternate between loading the first computation circuit with (a) most-significant bits of a first data set and most-significant bits of a weight value of the first data set, and (b) least-significant bits of a second data set and least-significant bits of a weight value of the second data set, the first multiplicand of the first selection being the first multiplicand loaded in the first computation circuit and the second multiplicand of the first selection being the second multiplicand loaded in the first computation circuit, and
load the second computation circuit with the second selection based on the load-balancing circuit being configured to alternate between loading the second computation circuit with (a) least-significant bits of the first data set and least-significant bits of the weight value of the first data set, and (b) most-significant bits of the second data set and most-significant bits of the weight value of the second data set, the first multiplicand of the second selection being the third multiplicand loaded in the second computation circuit and the second multiplicand of the second selection being the fourth multiplicand loaded in the second computation circuit; and
a fusion circuit configured to combine the first partial product with the second partial product to form a combined computation result.

10. The apparatus of claim 9, wherein the fusion circuit is further configured to shift a partial product a bit width no greater than a bit width of the first combination or a bit width of the second combination.

11. The apparatus of claim 9, wherein the load-balancing circuit is further configured to alternate between loading the first computation circuit with the first combination and the second combination.

12. The apparatus of claim 9, wherein:
the second predetermined number equals the third predetermined number, and
the load-balancing circuit is further configured to:
select one of the first combination, the second combination, a third combination comprising the second value being a first multiplicand of the third combination and the third predetermined number of contiguous bits of the first weight value, the third predetermined number of contiguous bits of the first weight value being a second multiplicand of the third combination, and a fourth combination comprising the third value being a first multiplicand of the fourth combination and the second predetermined number of bits of the first weight value, the second predetermined number of contiguous bits of the first weight value being a second multiplicand of the fourth combination, and
load, in a round robin fashion, the first computation circuit or the second computation circuit with the first combination, the second combination, the third combination, and the fourth combination.

13. The apparatus of claim 9, wherein the first combination and the second combination are selected from different cells of data.

14. The apparatus of claim 9, wherein a load-balancing technique used by the load-balancing circuit comprises a static load-balancing technique.

15. The apparatus of claim 9, wherein the load-balancing circuit is configured to select a load-balancing technique that reduces an amount of time the first computation circuit stalls.

16. The apparatus of claim 9, wherein the load-balancing circuit is further configured to:
load the first computation circuit with the first combination;
load the second computation circuit with the second combination; and
in response to the first computation circuit producing the first partial product and without regard to the second computation circuit not producing the second partial product, load the first computation circuit with a third combination of third data and third weight values.

17. The apparatus of claim 16, wherein the first computation circuit is configured to begin computing a third partial product based on the third combination without waiting for the second computation circuit to compute the second partial product.

18. An apparatus configured to provide a neural network, the apparatus comprising:
- a first computation circuit configured to compute a first partial product associated with a first value of a first cell of data, the first partial product comprising a product of a first data subdivision of the first value and a first weight value corresponding to the first value, each first value comprising a first predetermined number of bits and each first data subdivision of the first value comprising a second predetermined number of contiguous most-significant bits of the first value, the second predetermined number being less than the first predetermined number;
- a second computation circuit configured to compute a second partial product associated with the first value, the second partial product comprising a product of a second data subdivision of the first value and the first weight value, the second partial product being computed concurrently with computation of the first partial product, the second data subdivision of the first value comprising a third predetermined number of contiguous least-significant bits of the first value, the second predetermined number plus the third predetermined number equaling the first predetermined number;
- a load-balancing circuit configured to:
    - select a load-balancing technique that includes loading combinations of first data subdivisions and first weight values corresponding to the first data subdivisions, and loading combinations of second data subdivisions and first weight values corresponding to the second data subdivisions between the first computation circuit and the second computation circuit to reduce desynchronization between the partial products of the first computation circuit and the second computation circuit,
    - alternate between loading the first computation circuit with (a) most-significant bits of a first data set and most-significant bits of a weight value of the first data set, and (b) least-significant bits of a second data set and least-significant bits of a weight value of the second data set; and
    - alternate between loading the second computation circuit with (a) least-significant bits of the first data set and least-significant bits of the weight value of the first data set, and (b) most-significant bits of the second data set and most-significant bits of the weight value of the second data set; and
- a fusion circuit configured to combine the first partial product with the second partial product to form a combined computation result.

19. The apparatus of claim 18, wherein the fusion circuit is configured to shift a partial product result a bit width no greater than a bit width of the first data subdivision or a bit width of the second data subdivision.

20. The apparatus of claim 18, wherein the load-balancing circuit is further configured to alternate between loading the first computation circuit with combinations of first data subdivisions with first weight values corresponding to the first data subdivisions and combinations of second data subdivisions with first weight values corresponding to the second data subdivisions.

* * * * *